April 13, 1965 R. S. ROBINSON Re. 25,764

EMBEDMENT ANCHOR

Original Filed Jan. 22, 1959 2 Sheets-Sheet 1

INVENTOR.
RUSSELL S. ROBINSON

BY

ATTORNEY

April 13, 1965

R. S. ROBINSON

Re. 25,764

EMBEDMENT ANCHOR

Original Filed Jan. 22, 1959

2 Sheets-Sheet 2

INVENTOR.
RUSSELL S. ROBINSON

BY

ATTORNEY

United States Patent Office

Re. 25,764
Reissued Apr. 13, 1965

25,764
EMBEDMENT ANCHOR

Russell S. Robinson, Newport Beach, Calif., assignor, by mesne assignments, to PneumoDynamics Corporation, Cleveland, Ohio, a corporation of Delaware Original No. 3,036,542, dated May 29, 1962, Ser. No. 788,314, Jan. 22, 1959. Application for reissue May 28, 1964, Ser. No. 395,970
13 Claims. (Cl. 114—206)

Matter enclosed in heavy brackets [ ] appears in the original patent but forms no part of this reissue specification; matter printed in italics indicates the additions made by reissue.

This invention relates to anchors and more particularly to an embedment anchor in which an explosive charge is used to drive the anchor into an ocean bottom or the like so that the anchor has a high holding power.

It is an important object of this invention to provide a new and improved embedment anchor.

It is another object of this invention to provide an embedment anchor having explosive propulsion means and an ignition means which are insensitive to water depth.

It is another object of this invention to provide an ignition system for an embedment anchor which prevents the ignition of the propulsion charge until the anchor is immersed in water.

It is another object of this invention to provide an embedment anchor having an explosive propulsion means which provides maximum utilization of the propulsion energy.

It is still another object of this invention to provide an embedment anchor having a coil of anchor cable within the anchor housing which prevents strains from being transmitted to the anchor cable when the anchor is operated to embed itself in the ocean bottom.

It is still another object of this invention to provide an embedment anchor having a cable connection intermediate the ends of the anchor so that any force on the cable tending to loosen the anchor produces a force moment which moves the anchor crosswise to the direction of the cable.

Further objects and advantages will appear from the following description and the drawings, wherein.

Figure 1:
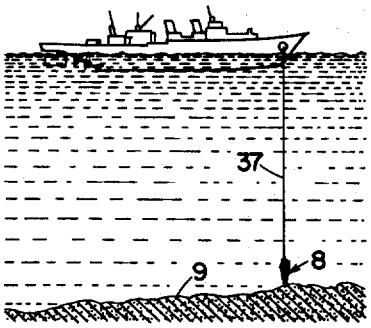
FIGURE 1 is a schematic illustration of an embedment anchor according to this invention showing the anchor as it engages the ocean bottom.
Figure 2:
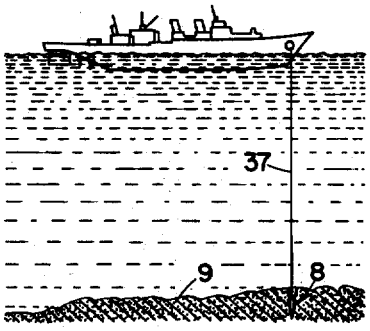
FIGURE 2 is a view similar to FIGURE 1 showing the elements after the anchor has embedded itself in the bottom.

An anchor which includes propulsion means to embed the anchor has the advantage of providing large anchoring forces with the relatively lightweight structure. The anchor is provided with a safety means which insures that the propelling charge used to embed the anchor cannot be ignited before the anchor is lowered into the water. It also has a firing mechanism which is insensitive to water pressure so that it will only ignite the propelling charge upon engagement of the anchor with the ocean bottom. In FIGURES 1 and 2, the operation is schematically shown. When the anchor 8 engages the ocean bottom 9 as shown in FIGURE 1, the propellant charge drives the anchor into the bottom as shown in FIGURE 2.

The anchor 8 includes an anchor body comprising a main tubular housing 10 formed with axially extending symmetrical fins 11. Threaded onto the lower end of the housing 10 is a nose member 12 formed with a central bore 13 in which is positioned a battery 14 used to ignite a propellant charge 16. The propellant charge 16 is located within a cup-shaped piston 17 positioned within the tubular housing 10 adjacent to the nose member 12. The piston 17 is formed with a thin lip 18 which is clamped between the hose member 12 and the tubular housing 10. This lip provides a fluid tight seal to prevent water from reaching the ignition mechanism and the propellant charge 16 but is proportioned so that it is pulled out of its clamped engagement by the force developed upon ignition of the charge 16. An electrically operated squib 19, positioned in the bore 13 adjacent to the propellant charge 16, is electrically ignited upon engagement of the anchor with the bottom of the body of water and in turn operates to ignite the propellant charge 16.

The electrical circuit used to ignite the squib 19 includes a water operated safety switch 21 and a firing pin type switch 15 both connected in series between the battery 14 and the squib 19. The water safety switch 21 is merely a conductor 23 which connects to the upper terminal of the battery 14 and projects through the side wall of the nose member 12. The conductor 23 provides a bare end 20 insulated from the nose member 12 and positioned in a side port 24 formed in the nose member 12. The side port 24 provides a recessed location for the bared end 20 to protect it against damage. When the anchor is submerged in salt water, the water acts as a conductor to electrically connect the bare end 20 of the conductor 23 with the nose member 12 and ground the upper terminal of the battery 14. When water is not present to complete this circuit prior to the immersion of the anchor, the circuit is open and it is impossible for the charge 16 to be ignited even if the firing pin accidentally moves to the operated or closed position.

Figure 9:
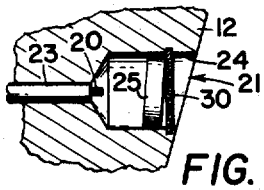
FIGURE 9 is an enlarged fragmentary view of the safety switch modified for use in fresh water.

In the event the anchor is to be used in fresh water which does not have sufficient conducting properties, it is merely necessary to place a tablet 25 (shown in FIGURE 9) of suitable electrolyte, such as salt, in the port 24 which is dissolved upon immersion of the anchor to provide the completion of the circuit. A piece of metal gauze 30 is used to retain the tablet in place.

Figure 8:
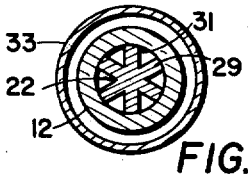
FIGURE 8 is a cross section taken along 8—8 of FIGURE 5.
Figure 5:
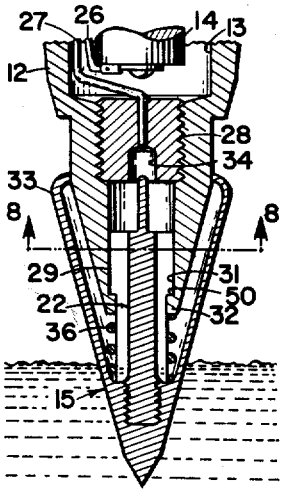
FIGURE 5 is an enlarged fragmentary view of the ignition or firing mechanism showing the ignition mechanism as it is initially immersed in water.
Figure 6:
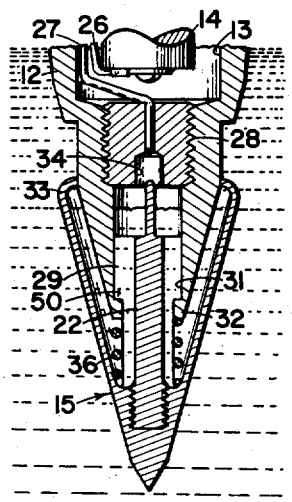
FIGURE 6 is a view similar to FIGURE 5 showing the firing mechanism when it is submerged prior to detonation of the propellant charge.
Figure 7:
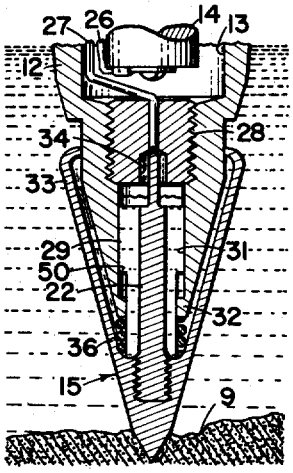
FIGURE 7 is a view similar to FIGURES 5 and 6 showing the operation of the firing mechanism when it ignites the propelling charge.
Figure 4:
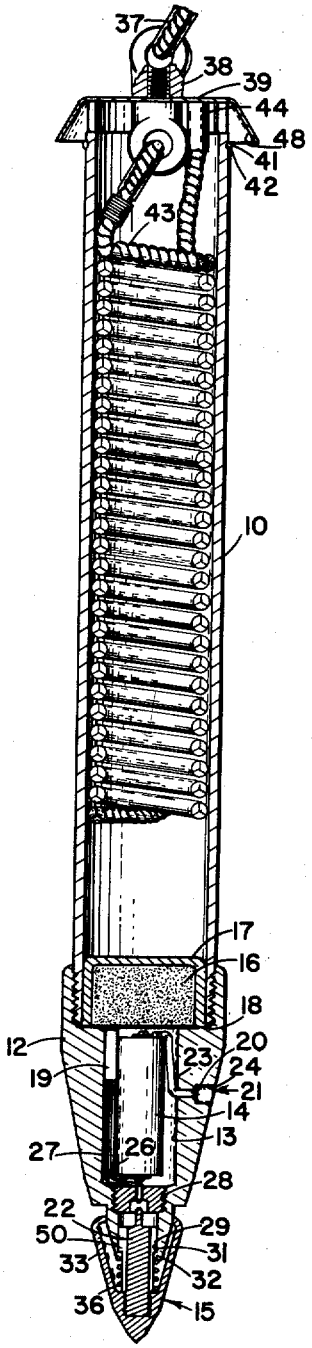
FIGURE 4 is a longitudinal section taken along 4—4 of FIGURE 3 showing the interior structure of the anchor.
Figure 3:
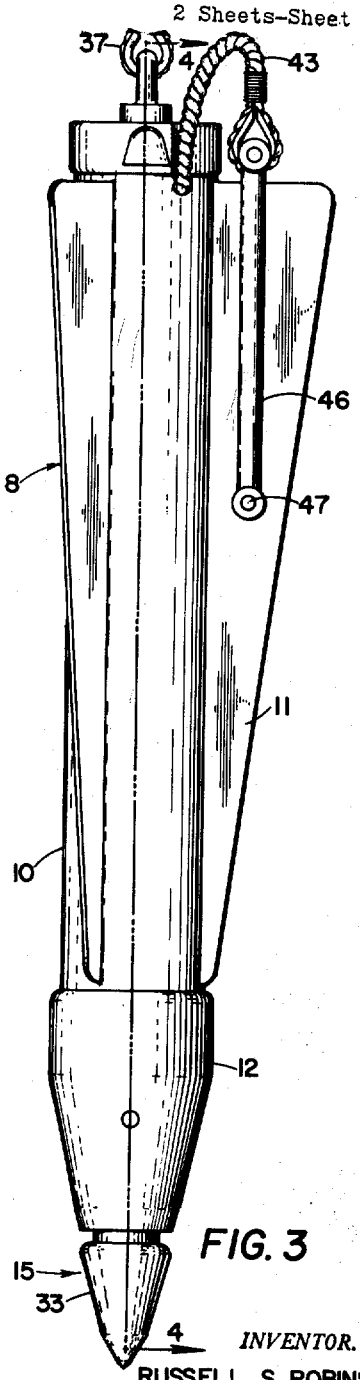
FIGURE 3 is an enlarged side elevation of an anchor according to this invention.

The lower terminal of the battery 14 is connected to one side of the squib 19 by a conductor 26. The other side of the squib 19 is connected by a conductor 27 to the firing switch 15. The conductor 27 extends with sealing engagement through an axial passage in an end member 28 threaded into the nose member 12 and provides a bare end positioned for engagement by a firing pin 22. This pin is formed with a spider section 29 guided along an end bore 31 for axial movement between the normal or open position shown in FIGURES 4, 5 and 6 and a closed or operated position shown in FIGURE 7. The lower end of the nose member 12 is formed with an inwardly extending shoulder 32 engageable by an outwardly extending shoulder 50 formed on the pin 22 to prevent downward movement of the firing pin 22 beyond the normal open position. A conical guide section 33 is threaded on the lower end of the firing pin 22 to prevent the entry of foreign matter into the bore 31 but does not provide a fluid tight seal with the nose member 12. When the anchor is lowered into the water, a small amount of air is trapped within the bore 31 which prevents water from reaching the bared end of the conductor 27 and thus prevents the hydraulic grounding of this conductor 27. The end member 28 is formed with a small diameter recess 34 best shown in FIGURES 5 through 7 in which the bared end of the conductor 27 is positioned. The cross sectional area of this recess is relatively small when compared to the cross section of the bore 31 so even though the anchor is lowered to substantial depths, in excess of 150 fathoms, the pressure of the water will not cause sufficient pressurization of the air trapped within the bore 31 to permit the water to reach the bared end of the conductor 27. FIGURES 7 and 8 illustrate the operation of the trapped air in preventing water from reaching the conductor 27. This structure also permits substantial tipping of the anchor from the vertical without loss of the trapped air. Because the firing pin 22 is exposed on all sides to the fluid under pressure, the pressure of the water has no effect on the firing pin 22 and does not tend to close the circuit.

A spring 36 extends between the end of the nose member 12 and the firing pin 22 normally maintaining the firing pin in the open position. This prevents the water resistance from moving the firing pin upward regardless of the rate of descent of the anchor. When the firing pin engages the bottom 9 of the body of water, the weight of the anchor overcomes the action of the spring 36 and moves the firing pin upward until it engages the bared end of the conductor 27 thereby grounding the conductor and completing the circuit. The completion of the electrical circuit operates to ignite the squib 19 and in turn the propellant charge 16. Ignition of the charge 16 causes the piston 17 to be expelled upwardly along the tubular housing 10 displacing the water contained therein producing a large thrust to drive the anchor into the bottom 9.

An anchor cable 37 is connected to the upper end of an eye 38 which is in turn mounted in a cap member 39. The cap member 39 is formed with an annular lip 41 which resiliently projects into a groove 42 around the upper end of the tubular housing 10 to releasably clamp the cap member 39 to the housing 10 and support the anchor in the vertical position as it is lowered. The eye 38 extends through the cap 39 and is provided with a lower portion to which is connected a short connecting cable 43. The connecting cable 43 is coiled within the storage recess defined by the tubular housing 10 and cap member 39 and has one end projecting through a slot 44 in the housing 10 immediately below the cap 39. This end of the connecting cable 43 is connected to one end of a link 46 which is in turn connected to the tubular housing 10 by a pivot 47 intermediate the ends of the housing 10. The connection between the cap 39 and the housing 10 is sufficient to support the weight of the anchor when it is handled on shipboard or lowered into the water but is not sufficient to overcome the large reaction force which occurs when the charge 16 is ignited. Therefore, the ignition of the charge 16 operates to drive the anchor downward into the bottom and also projects the cable 43 out of the housing 10. The coil of cable stored within the housing 10 provides sufficient slack to prevent a large thrust from being applied to the anchor cable and permits the anchor to freely move downward for maximum embedment.

The cap 39 is formed with scoops 48 which serves the double function of permitting entry of water into the housing 10 above the piston 17 and also providing a water resistance which assists in separating the cap 39 from the housing 10 when the charge is ignited. By insuring that the tubular housing 10 above the piston 17 is filled with water, improved performance is provided because the large mass of the water within the tubular hausing 10 is rapidly expelled upward by the piston 17 and produces a large thrust reaction on the anchor. Also, the mass of water within the housing 10 surrounding the cable 43 tends to provide a hydraulic connection which expels the cable from the housing before the piston 17 can engage the cable 43.

Once the anchor is embedded in the bottom, any force on the anchor cable 37 tending to remove the anchor is applied to the housing at the pivot 47. Since the pivot 47 is positioned eccentric of the housing and intermediate the ends, such a force produces a force couple tending to cock or rotate the anchor in the bottom to a position perpendicular to the cable. This prevents the movement of the anchor back up through the hole that it forms in the ocean bottom during the embedding operation and causes the entire side area of the anchor to resist the removal instead of the much smaller cross sectional area. By using this structure, the small cross section is all that resists embedment but the much larger side area resists removal.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An embedment anchor comprising a housing, explosive means in said housing operable to propel said housing and embed it in a solid upon contact therewith, a cap secured to said housing releasable therefrom in response to a predetermined force applied thereto, said cap co-operating with said housing to define a storage chamber, a cable having a portion coiled in said chamber, first means connecting one end of said coiled portion to said housing, and second means connecting the other end of said coiled portion to said cap, operation of said explosive means producing said predetermined force to release said cap.

2. An embedment anchor comprising a housing, explosive means in said housing operable to propel said housing and embed it in a solid upon contact therewith, a cap secured to said housing releasable therefrom in response to a predetermined force applied thereto, said cap co-operating with said housing to define a storage chamber, a cable having a portion coiled in said chamber, first means connecting one end of said coiled portion to said housing intermediate the ends thereof, and second means connecting the other end of said coiled portion to said cap, operation of said explosive means producing said predetermined force to release said cap.

3. An embedment anchor comprising a tubular housing, explosive means in said housing operable to propel said housing into a solid upon contact therewith, a cable having a portion coiled in said housing, first means connecting one end of said coiled portion to said housing intermediate the ends thereof, and second means connecting the other end of said coiled portion to said housing releasable therefrom in response to a predetermined force applied thereto, operation of said explosive means producing said predetermined force to release said second means.

4. An embedment anchor comprising a tubular housing, explosive means in said housing operable to propel said housing into a bottom of a body of water upon contact therewith, a cable having a portion coiled in said housing, first means connecting one end of said coiled portion to the outside of said housing intermediate the ends thereof, and second means connecting the other end of said coiled portion to said housing releasable therefrom in response to a predetermined force applied thereto, operation of said explosive means producing said predetermined force to release said second means.

5. A switch adapted to be submerged in a liquid comprising a body formed with a vertically extending recess open at its lower end, a conductor insulated from said body formed with a bared section in the upper portion of said recess, an element supported by said body for movement from a first position spaced from said bared section to a second position in engagement with said bared section, said recess being adapted to trap gas preventing contact between liquid and said bared section.

6. An embedment anchor comprising a housing, electrically ignitable propulsion means in said housing operable to drive said housing into the bottom of a body of water, a submersible switch operable to ignite said propulsion means, said switch including a body formed with a vertically extending recess open at its lower end, a conductor insulated from said body formed with an exposed end in the upper portion of said recess, an element supported by said body for movement under the influence of engagement with said bottom from a first position spaced from said exposed end to a second position in engagement with said exposed end, said recess being adapted to trap gas preventing contact between liquid and said bared section.

7. An embedment anchor comprising a housing, electrically ignitable propulsion means in said housing operable to drive said housing into the bottom of a body of water, a submersible switch operable to ignite said propulsion means, said switch including a body formed with a vertically extending recess open at its lower end, said recess including a lower portion having a first cross section and an upper portion having a cross section substantially less than said lower portion, a conductor insulated from said body formed with an exposed end in said upper portion, an element supported by said body for movement under the influence of engagement with said bottom from a first position spaced from said exposed end to a second position in engagement with said exposed end, said recess being adapted to trap gas preventing contact between liquid and said bared section.

8. An anchor adapted to embed itself in the bottom of a body of water comprising a tubular housing, a cable connected to one end of said housing, a propellant charge in said housing, a nose member on the other end of said housing formed with a vertically extending recess open only at its lower end, a first conductor insulated from said nose member having a bared end positioned at the upper end of said recess, said recess being adapted to trap gas preventing contact between liquid and said bared section, a firing element movable from a normal position spaced from said bared end to an operated position engaging said bared end, a second conductor insulated from said nose member formed with an end exposed to said water when said anchor is immersed, and electrical ignition means connected to both of said conductors operable to ignite said propellant when said firing element engages said bared end and said second conductor is immersed in water.

9. An anchor adapted to embed itself in the bottom of a body of water comprising a housing assembly, an anchor cable connected at its end to said assembly, a propellant charge in said body operable on ignition to propel said body downward, said cable including a portion coiled in said body assembly, separable means connected between said cable above said coil and said assembly maintaining said anchor in a vertical position prior to the ignition of said propellant charge, ignition means connected to said propellant charge including a firing mechanism operable to ignite said charge upon engagement between said anchor and said bottom, and a safety mechanism connected to said ignition means operable to permit ignition of said propellant charge onl when said anchor is immersed in water.

[10. An embedment anchor comprising an ancho body, a member releasably secured to said anchor bod an explosive charge operable to separate said membe from said anchor body by reaction therewith and to prc pel said anchor body and embed it in the earth, an ar chor cable connected to said member for lowering sai embedment anchor into the water, and a slack length c cable connected at one end to said anchor body at point intermediate its ends and connected at its othe end to said anchor cable.]

11. An embedment anchor comprising an anchor bod a member releasably secured to said anchor body, a explosive charge operable to separate said member fror said anchor body by reaction therewith, and to prop said anchor body and embed it in the earth, detonatio means on said anchor body operably connected to sai charge for igniting said charge in response to engag ment between said detonation means and the earth onl after said anchor is immersed in water, an anchor cabl connected to said member for lowering said embedmer anchor into the water, and a slack length of cable cor nected at one end to said anchor body at a point inte mediate its ends and connected at its other end to sai anchor cable.

12. An embedment anchor comprising an anchor bod a member releasably secured to said anchor body, a explosive charge operable to separate said member fro said anchor body by reaction therewith and propel sai anchor body and embed it in the earth, detonation mear mounted on said anchor body for movement relati thereto in response to engagement thereof with the eart and means connecting said detonation means and char for igniting said charge in response to movement of sa detonation means after said anchor is immersed in wate an anchor cable connected to said member for lowerir said embedment anchor into the water, and a slack leng of cable connected at one end to said anchor body a point intermediate its ends and connected at its oth end to said anchor cable.

*13. An embedment anchor comprising a projectile a sembly including an anchor body, a recoil assembly r leasably secured to said projectile assembly, an explosi charge operable to separate said projectile assembly fro said recoil assembly by reaction therewith and to prop said anchor body and embed it in the earth, one of sa projectile and recoil assemblies having a wall portic forming a partial enclosure for lateral containment of quantity of water upon lowering of the anchor into body of water, with such quantity of water by virtue its lateral confinement adding to the thrust reaction the projectile assembly upon detonation of said expl sive charge, and cable means for lowering said embe ment anchor into the water.*

*14. An embedment anchor as set forth in claim wherein the wall portion which forms a partial enclosu for a quantity of the water upon submersion of the anch defines an upwardly open chamber.*

References Cited by the Examiner

The following references, cited by the Examiner, a of record in the patented file of this patent or the origin patent.

UNITED STATES PATENTS

| | | | |
|---|---|---|---|
| 721,677 | 3/03 | Dornfeld | 200—61. |
| 1,560,451 | 11/25 | Weyrick | 189— |
| 2,433,234 | 12/47 | McHugh | 102— |
| 2,583,965 | 1/52 | Page et al. | |
| 2,708,860 | 5/55 | Arpin | 89— |
| 2,888,768 | 6/59 | Taylor | 29—2 |
| 3,032,000 | 5/62 | Feiler | 114—20 |

FERGUS S. MIDDLETON, *Primary Examiner.*

MILTON BUCHLER, *Examiner.*